United States Patent [19]

Kato

[11] Patent Number: 4,928,787
[45] Date of Patent: May 29, 1990

[54] MOBILE SPEAKER SYSTEM
[75] Inventor: Toshifumi Kato, Yamagata, Japan
[73] Assignee: Pioneer Electronic Corporation, Tokyo, Japan
[21] Appl. No.: 342,825
[22] Filed: Apr. 25, 1989
[30] Foreign Application Priority Data Aug. 26, 1988 [JP] Japan ............................ 63-111828[U]
Aug. 26, 1988 [JP] Japan ............................ 63-111829[U]

[51] Int. Cl.$^5$ ............................................. H05K 5/00
[52] U.S. Cl. ................................. 181/141; 181/144; 181/148; 181/153; 181/156; 181/199; 381/86
[58] Field of Search ............... 181/141, 156, 144, 148, 181/153, 199; 381/86

[56] References Cited
U.S. PATENT DOCUMENTS 4,514,599 4/1985 Yanagishima et al. ............ 381/86 X
4,551,849 11/1985 Kasai et al. ......................... 381/86
4,582,162 4/1986 Kutsuno .............................. 181/141

Primary Examiner—Benjamin R. Fuller
Attorney, Agent, or Firm—Sughrue, Mion, Zinn, MacPeak & Seas

[57] ABSTRACT

A mobile speaker system for mounting on a rear parcel tray attachment portion of a vehicle, the speaker system includes: a bottom casing elongated along a vehicle's width; an upper casing mounted over the elongated bottom casing so as to form a speaker cabinet, the bottom casing having a plurality of first ribs projecting in a first direction, and a plurality of second ribs projecting in a second direction which is substantially perpendicular to the first direction; and fixing metal fittings attached to at least one of the ribs so as to prevent transformation of the bottom casing. In one embodiment, the upper casing includes a recess portion at a central portion thereof, an opening portion formed in the recess portion for mounting a woofer unit, and two ducts for a bass-reflex type cabinet are formed at opposite sides of the opening portion.

19 Claims, 6 Drawing Sheets

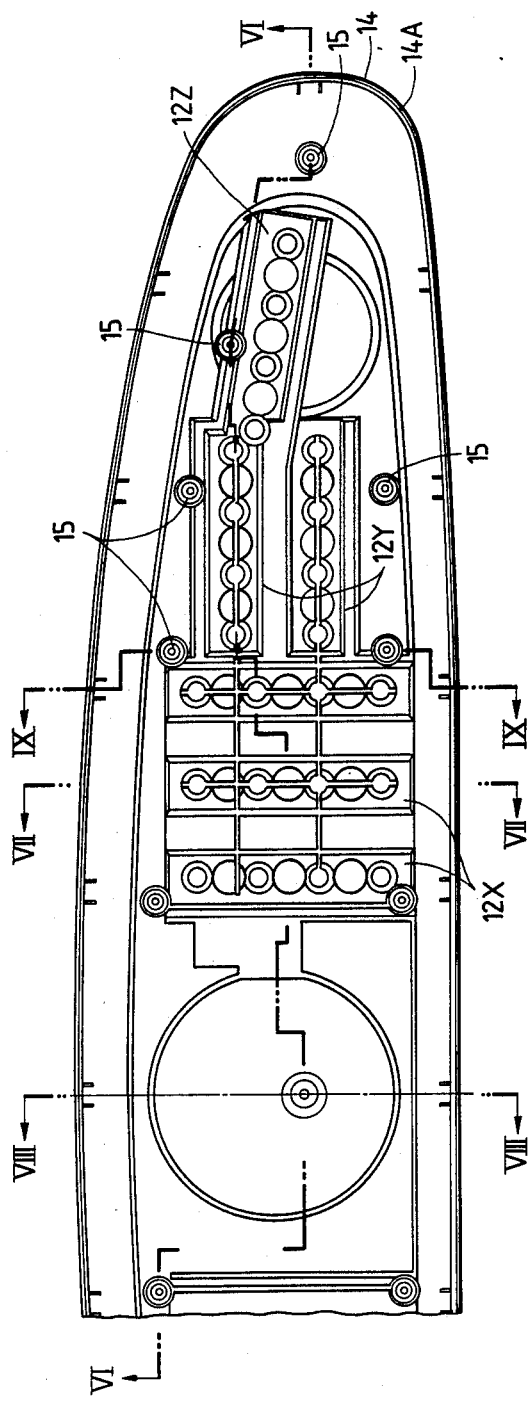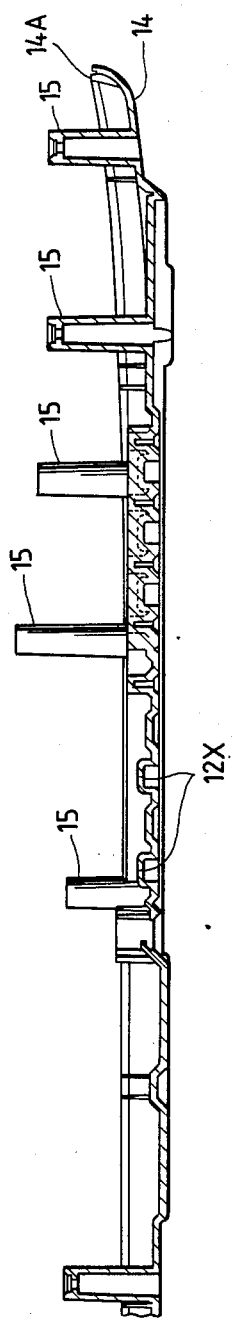
FIG. 5
FIG. 6

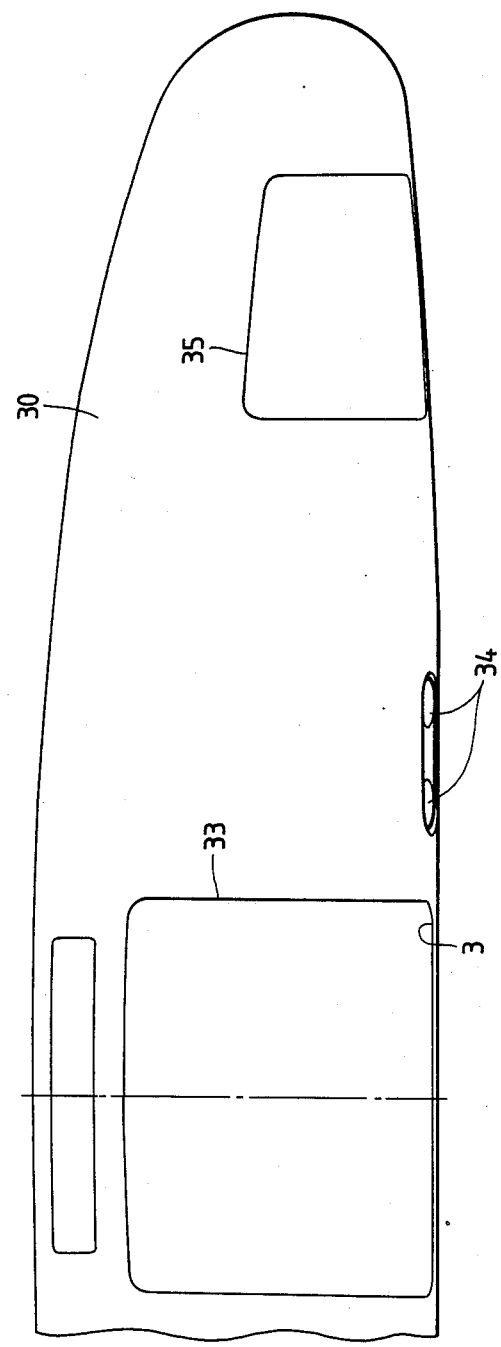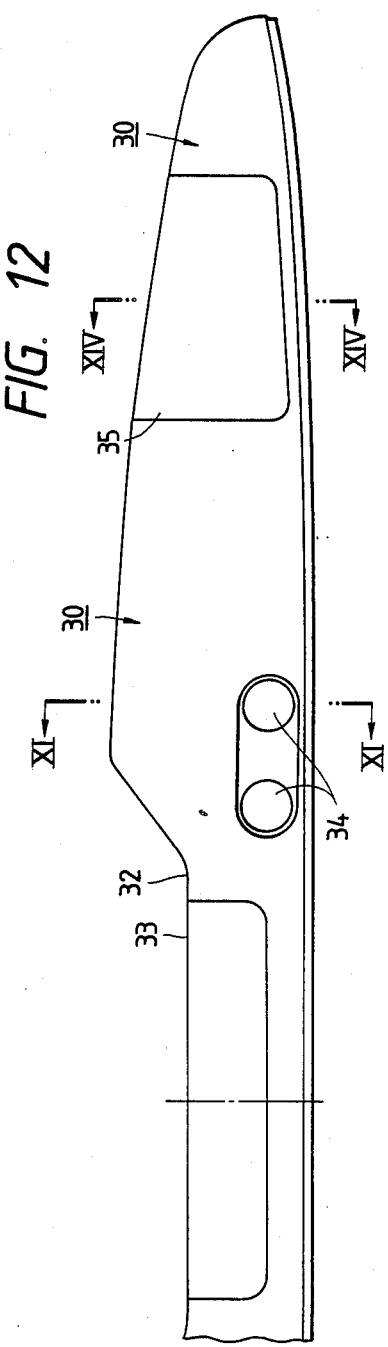

4,928,787

MOBILE SPEAKER SYSTEM

FIELD OF THE INVENTION

The present invention relates to a mobile speaker system, and more particularly relates to a mobile speaker system which is attached to the rear parcel tray (hereinafter "tray") of a vehicle.

BACKGROUND OF THE INVENTION

In a known mobile speaker system, the system is separately attached to the vehicle tray for both the left and right channels by mounting or embedding means, although there are different types of mobile speaker systems, (e.g., three-way systems multi-way systems, and the like). In the case of a fixed-type system, the left and right speaker systems are independently or separately fixed on the tray of the vehicle.

Accordingly, although the design of a vehicle may change each year, there is little freedom to change the design of the speaker system from the connection with the vehicle. The shape of the cabinet cannot be largely changed due the limitation or requirement of mobility. Accordingly, the design lacks novelty. Further, it is difficult to find the best design of the vehicle space, which can be tightly closed, relative to ideal acoustical conditions. In particular, although it is desirable to use a bass-reflex type speaker cabinet, rather than an airtight speaker cabinet, to expand a flat reproducing band, there is a problem in that the duct opening cannot be made sufficiently large.

SUMMARY OF THE INVENTION

It is therefore an object of the present invention to provide speaker systems which are novel corresponding to the change of the vehicle design, in which a woofer unit having low directivity is made into a so-called three dimensional stereo system with left and right channels made in one, in which a speaker cabinet is formed to be a single shape elongated along the shape of a tray so that the woofer unit is attached to the central portion of the speaker cabinet and in which speaker units such as tweeters and the like for left and right channels are mounted on the left and right sides of the woofer unit.

In order to achieve this object, the mobile speaker system, according to an embodiment of the present invention, is mounted on a rear parcel tray attachment portion and is characterized in that the speaker system comprises a bottom casing elongated along a car width, and an upper casing mounted over the elongated bottom casing so as to form a speaker cabinet. The bottom casing is provided with a plurality of ribs, some of which project inward along a widthwise direction, and others of which project along a lengthwise direction. The mobile system according to this embodiment also includes fixing metal fittings attached to some of the ribs so as to prevent transformation of the bottom casing.

It is another object of the invention to provide a mobile speaker system in which a reproducing band, which is flat in the vicinity of $f_o$, can be expanded.

In order to achieve this object, a single mobile bass-reflex type speaker system according to another embodiment of the invention is provided. In the speaker system according to this embodiment, a bottom casing is formed to follow the shape of the rear parcel tray and is covered with an upper casing. The speaker system is characterized in that a woofer speaker unit is located at a central position of the upper casing where the height is made low, middle and tweeter speaker units for left and right channels are located at opposite sides of the woofer speaker system, respectively, and a plurality of ducts horizontally formed side by side which are opened in attachment portions of the middle and tweeter speaker units closer to the center of the attachment portions. This embodiment provides an improvement of a cabinet in which the dimensional limitations for mounting the cabinet on a vehicle is overcome, and in which the lowest resonance frequency is made low.

BRIEF DESCRIPTION OF THE DRAWINGS

FIG. 5 is a plan view of same;

FIG. 6 is a sectional VieW taken on line VI—VI of FIG. 5;

FIG. 10 is a plan view of an upper casing;

FIG. 12 is a front view of the upper casing;

PREFERRED EMBODIMENTS OF THE INVENTION

Figure 1:
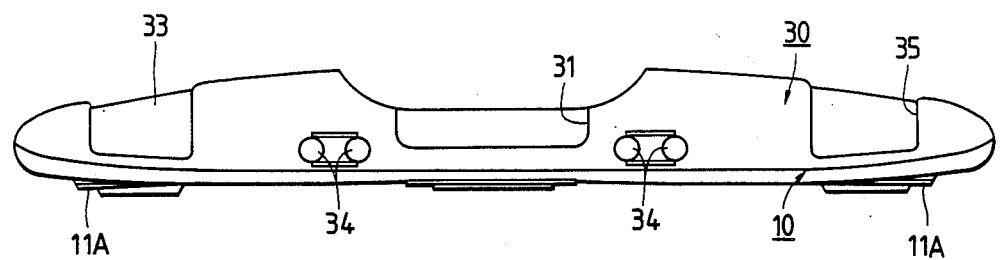
FIG. 1 is a front view of the mobile speaker system present invention.
Figure 4:
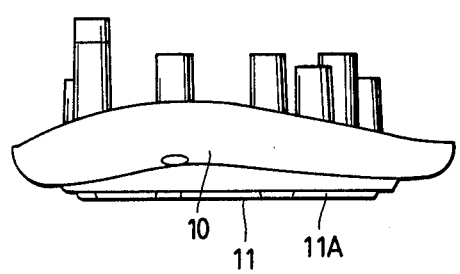
FIG. 4 is a side view of same.
Figure 7:
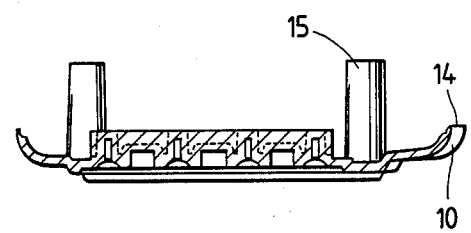
FIG. 7 is a sectional view taken on line VII—VII of FIG. 5.
Figure 8:
FIGS. 8 and 9 are sectional views taken on lines VIII—VIII and IX—IX of FIG. 5 respectively.
Figure 9:
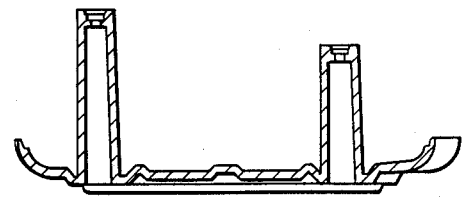

Referring to the drawings, the mobile speaker system according to the present invention will be described. Referring to FIG. 1, the mobile speaker system particularly the cabinet thereof, is formed to be a shape which is elongated in the direction of the vehicle width and to follow the tray of a vehicle. The system includes a bottom casing 10 constituting a cabinet, and an upper casing 30 arranged to cover the bottom casing 10 so as to be integrally combined therewith. Speaker units for left and right channels are mounted on the right and left sides of the cabinet, and a woofer unit is mounted upwardly in the center portion between the left and right channel speaker units so that the height of the system is made low only at woofer unit portion whereby the range of vision of the system is not inhibited.

Figure 2:
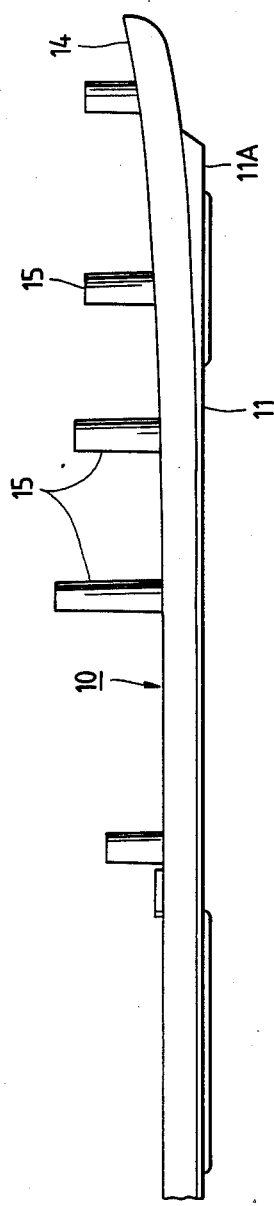
FIG. 2 is a front view of a bottom casing with its left omitted.
Figure 3:
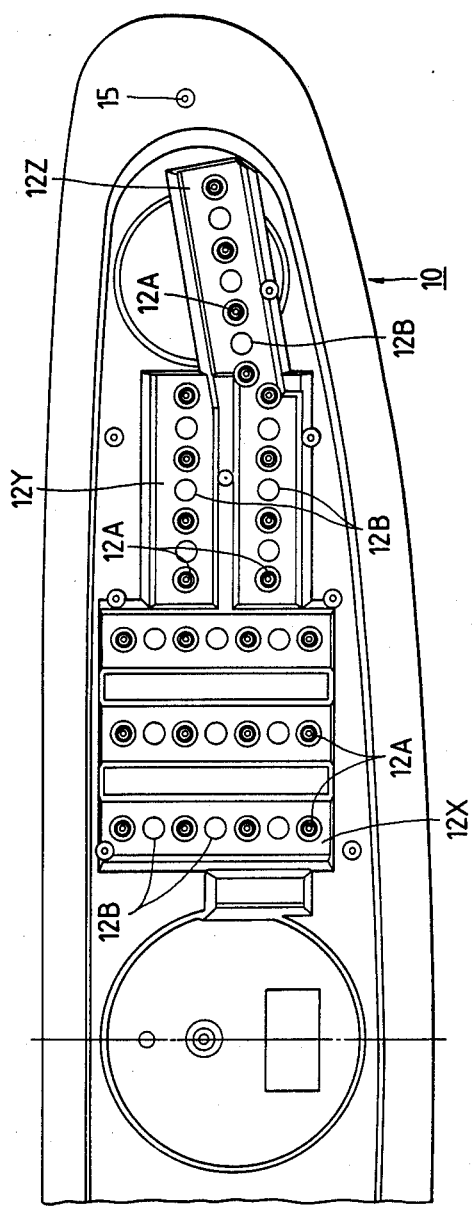
FIG. 3 is a bottom view of same.

First, the bottom casing 10 will be described. Referring to FIGS. 2-3, the bottom casing 10 is elongated along the car Width and has a width which is selected to be accommodated in an average longitudinal dimension of the tray of a vehicle. The bottom casing 10 is formed into a single ship-like shape following the shape of a vehicle tray. Although the bottom casing 10 is symmetrical with respect to its center and the bottom surface thereof is included in the same plane for easy mounting the left and right end portions of the bottom casing 10 are curved slightly upward, and stepped seats 11A are formed so as to make the left and right end portions fit to the level of the bottom surface 11. A concave groove 14A is formed in an edge portion 14 (FIG. 6).

Figure 15:
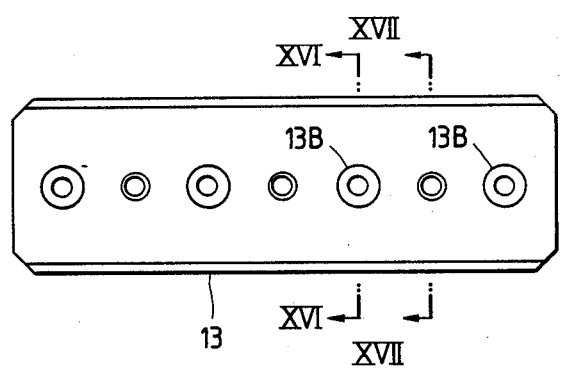
FIG. 15 is a plan view of fixing metal fittings.
Figure 16:
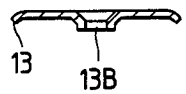
FIGS. 16 and 17 are sectional views taken on lines XVI—XVI and XVII—XVII of FIG. 15.
Figure 17:
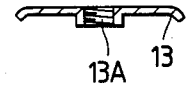

Referring to FIG. 3 three ribs 12X are formed in a widthwise direction on the bottom surface 11 in the vicinity of the longitudinally extending central portion of the bottom surface 11. Each of the ribs 12X is concave on the bottom surface 11 side and is convex on the inner space side (on the upper casing side). Two ribs 12Y are formed side by side in a direction substantially perpendicular to the ribs 12X, that is, in the longitudinal direction, and rib 12Z is formed on the end portions beyond the ribs 12Y. The ribs 12Y and 12Z are concave on the bottom surface 11 side and are drag convex on the inner space side. All the ribs 12X, 12Y, and 12Z are of the same shape. Referring to FIGS. 15–17, fixing metal fittings 13, acting as a reinforcing plate are attached to the ribs 12X, 12Y, and 12Z. Screw holes 13A and through holes 13B are formed at regular pitches in the fixing metal fittings 13 corresponding to the two kinds of holes, that is, screw holes 12A and through holes 12B are formed in the ribs 12X, 12Y, and 12Z (FIG. 3). The through holes 13B and the screw holes 13A of the fixing metal fittings 13 are arranged to register with the screw holes 12A and the through holes 12B respectively.

An edge portion 14 (FIGS. 5–6) for forming the contour of the bottom casing 10 is formed upwardly, and a concave groove 14A is formed in a parting surface between the edge portion 14 and the upper casing 30. Screw seats 15 for screwing the upper casing 30, which covers the bottom casing 10, are erected at suitable positions in the surrounding of the ribs 12 so as to act as spacers.

Figures 11, 13:
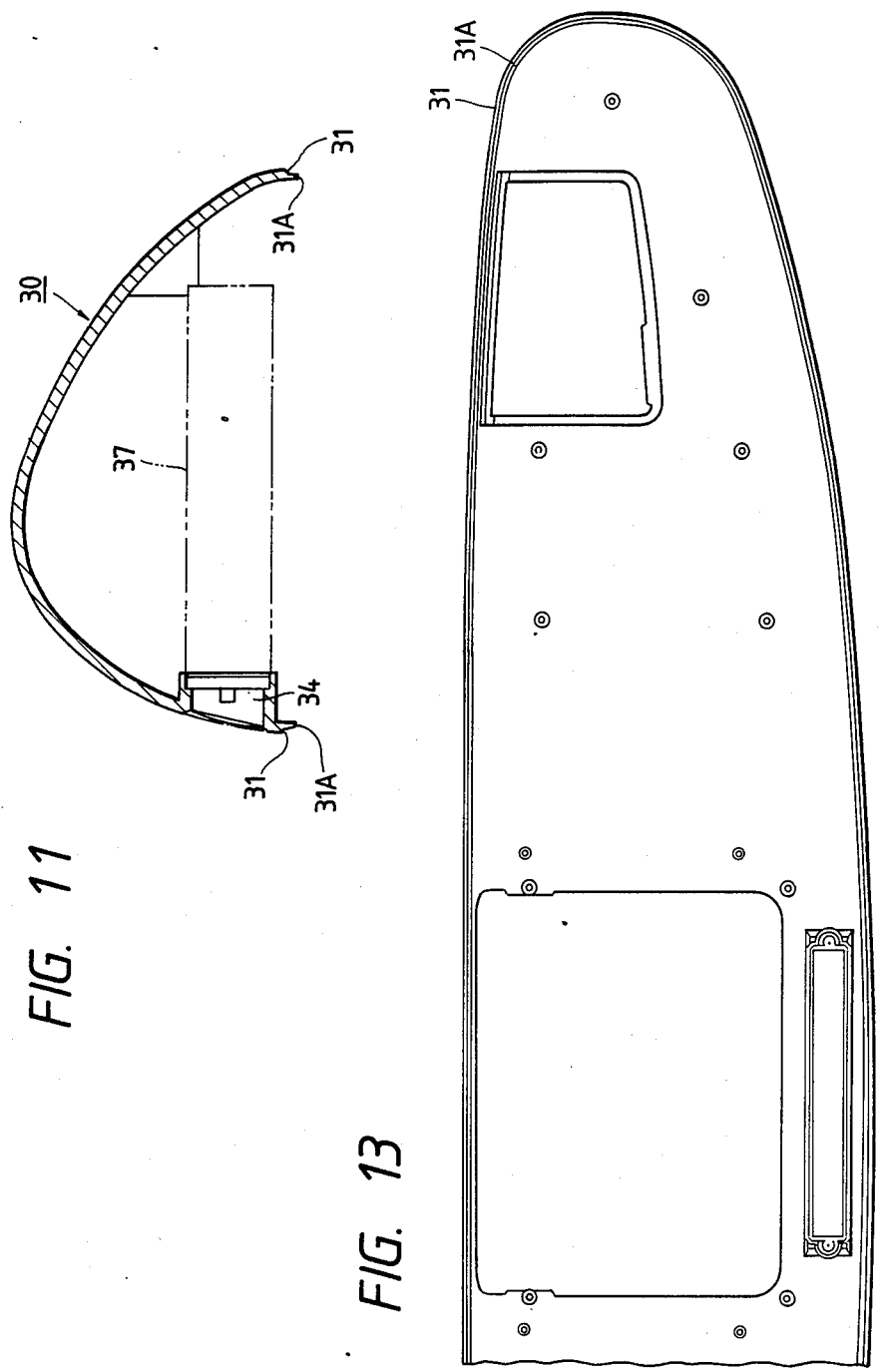
FIG. 11 is a sectional view of line XI—XI of FIG. 12.
FIG. 13 is a bottom view of same.

The upper casing 30 (Figs 10 and 12–13) which has the same shape as the bottom casing is placed over the bottom casing 10, and is integrally combined with the latter with screws to thereby constitute the speaker cabinet. A convex strip 31A is arranged to fit in the concave groove 14A in the edge portion 14, and is formed on an edge portion 31 for forming a contour of the upper casing 30 (FIG. 13).

Referring to FIG. 12, a recess portion 32 reduced in height is formed in the upper casing 30 at its central portion and an opening portion 33 for mounting a woofer unit is formed in the recess portion 32 at its bottom portion. Further two ducts 34 for constituting a bass-reflex type cabinet are formed at the opposite sides of the opening portion 33, as will be described below in more detail in connection with another embodiment of the invention. Opening portions 35 for mounting speaker units such as mid-range speakers, tweeters, and the like, are formed in the upper casing 30 at its opposite end portions respectively.

Figure 14:
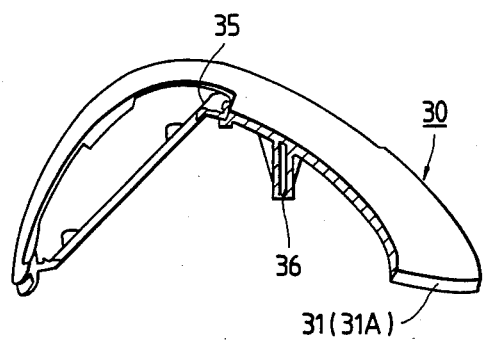
FIG. 14 is an enlarged sectional view taken on line XIV—XIV of FIG. 12.

The upper casing 30 is gradually reduced in height toward the opposite end portions so as to form a gently curved surface, and screw seats 36 (FIG. 14) through which screws are passed, are formed inside the upper casing 30, that is, on the cabinet inside space side in connection with the screw seats 15 on the bottom casing 10 (FIGS. 5–6).

The upper casing 30 having speaker units (not shown) mounted thereon is placed over the bottom casing 10, screws having a selected length are screwed from the screw seats 36 into the screw seats 15 respectively, and the concave groove 14A and the convex strip 31A of the edge portions 14 and 31 of both the casings 10 and 30 are fitted to each other so that the speaker cabinet is thus completed.

Further, the fixing metal fittings 13 are placed upon the bottom casing 10 at its lower surface corresponding to the ribs 12, and screws are screwed from the through holes 13B of the fixing metal fittings 13 into the screw holes 12A of the bottom casing 10 so as to integrally combine the bottom casing 10 and the fixing metal fittings 13.

By integral combination of the bottom casing 10 and the fixing metal fittings 13, the hardness or rigidity of the narrow speaker cabinet is improved. When the speaker cabinet is supported, the rigidity is exhibited against transformation of the speaker cabinet in which the opposite end portions of the cabinet are bent downward due to its own weight.

The system can be attached to a car body by screwing screws into the screw holes 13A of the fixing metal fittings 13, from the car body side, particularly from the constituent member side of the tray portion.

As is apparent from the above description, the mobile speaker system is formed in a shape which is elongated in the direction of a car width and which follows the shape of the tray portion of a vehicle. The speaker cabinet is constituted by the bottom casing and the upper casing, and fixing metal fittings having the same shape as those of the respective ribs are attached to the ribs formed on the lower surface of the bottom casing so as to have directions different from each other. As a result, the rigidity of the system is increased due to the rigidity of the fixing metal fittings. Further, the mobile speaker system can provide a novel design corresponding to the vehicle tray.

Referring now to FIGS. 3 and 11, another embodiment of the invention will be described. This embodiment relates to a mobile bass-reflex type speaker system. An attachment portion AP for mounting a woofer speaker unit of a three-dimensional stereo system is provided on the bottom casing 10 at its central portion (FIG. 3). Referring to FIGS. 10–12, two ports 34 are formed side by side in the front of the upper casing 30 at nearly central lower portions. Referring to FIG. 11, first end portions of ducts 37 are connected to the ports 34, and the inside the cabinet so as to be able to cause phase inversion. Since the two ports 34 opened in the upper casing 30 are located side by side horizontally, even if each port is small in area, the opening area required for bass reflex is sufficiently ensured and the height of the cabinet is not required to be made high.

Thus, the mobile bass-reflex type speaker system according to this embodiment of the present invention has a configuration in which a cabinet has a single shape following the shape of a tray of a vehicle, an opening portion for mounting a woofer speaker unit of a three-dimensional stereo system formed in the cabinet at its central recessed portion, a plurality of ports formed side by side horizontally on the opposite sides of the opening portion, and ducts connected to the ports respectively. As a result, the opening area of each of the ports can be made large without increasing the effective height of the cabinet; and since a three-dimensional stereo system is employed the height of the cabinet can be made low at its central portion, so that the rear view of the vehicle will not be inhibited.

I claim:

1. A mobile speaker enclosure system for enclosing at least one speaker unit suited for mounting on a rear parcel tray attachment portion of a vehicle, the speaker enclosure system comprising:

a bottom casing elongated in a direction of a width of said vehicle;

an upper casing mounted over said elongated bottom casing so as to form a speaker enclosure cabinet for enclosing said at least one speaker unit, said bottom casing having a plurality of first selective support ribs projecting in a first direction, and a plurality of second selective support ribs projecting in a second direction which is substantially perpendicular to the first direction; and fixing metal fittings selectively attachable to at least one of said selective support ribs so as to increase a rigidity of said bottom casing along said at least one of said selective support ribs and prevent shape transformation of said bottom casing.

2. The system as defined in claim 1, wherein a shape of said bottom casing is formed and selectively supported by said fixing metal fittings attached to selected ones of said selective support ribs such that said bottom casing follows a shape of the tray attachment portion of said vehicle.

3. The system as described in claim 1, wherein end portions of said bottom casing are curved slightly upward, and wherein said bottom casing includes stepped seats for allowing the end portions to fit to a same level as that of a bottom surface of said bottom casing.

4. The system as defined in claim 1, wherein said bottom casing has an edge portion forming a contour, with a concave groove formed along a surface of said edge portion for receiving a mounting engagement of said upper casing, and screw seats for screwing said upper casing onto said bottom casing.

5. The system as defined in claim 1, wherein said first selective support ribs includes three ribs, each of the three ribs being concave on a bottom surface side, and convex on an inner space side facing said upper casing.

6. The system as defined in claim 1, wherein said second selective support ribs include two ribs formed side by side to each other, and wherein said bottom casing further comprises a third selective support rib formed on an end portion of said bottom casing at a position which is closer to said end portion than said second selective support ribs.

7. The system as defined in claim 6, wherein each of said second and third selective support ribs are concave on a bottom surface side of said bottom casing and convex on an inner side facing said upper casing.

8. The system as defined in claim 1, wherein holes are formed in said fixing metal fitting, and wherein holes are formed in said ribs which are in register with the holes of said fixing metal fitting.

9. The system as defined in claim 1, wherein said upper casing includes a recess portion at a central portion thereof, and an opening portion formed in said recess portion for mounting a woofer unit, and two ducts for a bass-reflex type cabinet are formed at opposite sides of the opening portion.

10. A single mobile bass-reflex type speaker enclosure system suited for mounting on a rear parcel tray of a vehicle, the system comprising:

a bottom casing;

an upper casing for covering said bottom casing, said bottom casing having a shape which follows a shape of said rear parcel tray;

a woofer speaker unit located at a central portion of said upper casing where a height of said central portion is reduced relative to a height of remaining portions of said upper casing;

middle and tweeter speaker units for left and right channels disposed at opposite sides of said woofer speaker unit, respectively;

a plurality of ports formed side by side in a surface of said upper casing at a central lower portion thereof to face toward a front of said vehicle; and ducts having first ends thereof respectively connected to said ports.

11. The system as defined in claim 10, wherein said ducts have second ends extending inside of said upper casing for causing a phase inversion of any sound transmitted from an inner area of said speaker enclosure system through said ducts.

12. The system as defined in claim 10, wherein said bottom casing includes a plurality of first selective support ribs projecting in a first direction, and a plurality of second selective support ribs projecting in a second direction which is substantially perpendicular to the first direction.

13. The system as defined in claim 12, further comprising:

fixing metal fittings selectively attachable to at least one of said selective support ribs so as to increase a rigidity of said bottom casing along said at least one selective support rib and prevent shape transformation of said bottom casing.

14. The system as defined in claim 10, wherein end portions of said bottom casing are curved slightly upward, and wherein said bottom casing includes stepped seats for allowing the end portions to fit to a same level as that of a bottom surface of said bottom casing.

15. The system as defined in claim 10, wherein said bottom casing has an edge portion forming a contour, with a concave groove formed along a surface of said edge portion for receiving a mounting engagement of said upper casing, and screw seats for screwing said upper casing onto said bottom casing.

16. The system as defined in claim 10, wherein said first selective support ribs includes three ribs, each of the three ribs being concave on a bottom surface side, and convex on an inner space side facing said upper casing.

17. The system as defined in claim 10, wherein said second selective support ribs includes two ribs formed side by side to each other, and wherein said bottom casing further comprises a third selective support rib formed on an end portion of said bottom casing at a position which is closer to said end portion than said second selective support ribs.

18. The system as defined in claim 17, wherein each of said second and third selective support ribs are concave on a bottom surface side of said bottom casing and convex on an inner side facing said upper casing.

19. The system as defined in claim 10, wherein holes are formed in said fixing metal fitting, and wherein holes are formed in said ribs which are in register with the holes of said fixing metal fitting.

* * * * *